Figure 1:
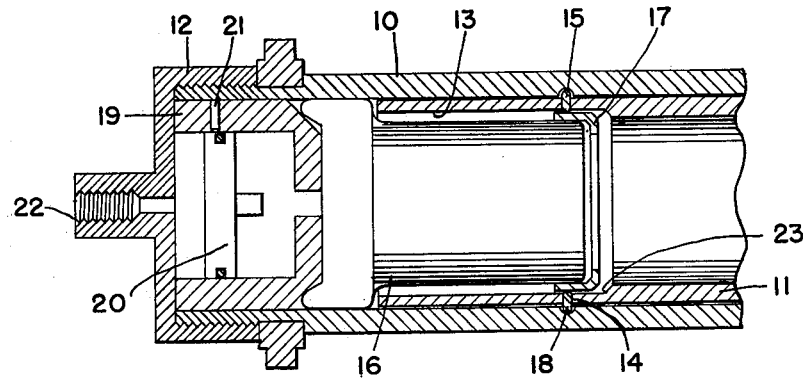

Dec. 3, 1963   C. J. LITZ, JR   3,112,670
GAS PRESSURE OPERATED DEVICE
Filed Sept. 26, 1962

INVENTOR.
CHARLES J. LITZ, JR.
BY S. J. Rotondi,
A. J. Dupont & S. Dubroff
ATTORNEYS

3,112,670
GAS PRESSURE OPERATED DEVICE

Charles J. Litz, Jr., Philadelphia, Pa., assignor to the United States of America as represented by the Secretary of the Army
Filed Sept. 26, 1962, Ser. No. 227,639
1 Claim. (Cl. 89—1)
(Granted under Title 35, U.S. Code (1952), sec. 266)

The invention described herein may be manufactured and used by or for the Government for governmental purposes without the payment to me of any royalty thereon.

This invention relates to gas pressure operated devices such as are utilized for various purposes in aircraft emergency escape systems and the like. These devices ordinarily include two or more telescopic tubes which are interlocked during standby conditions and are unlocked and moved apart under emergency conditions by a gas pressure generated upon the firing of an explosive cartridge. As is well known, one of these telescopic tubes is fixed to the aircraft and another of them is attached to the part to be moved with respect to or separated from the aircraft.

Heretofore, various means of locking these telescopic tubes together have been provided. These prior art locking means, however, have not been altogether saisfactory for the reason that they are incapable of withstanding the drop tests specified by the users of the device. Such drop tests involve the dropping of the device from a height of six feet onto a plate, the point of contact on the first drop being the piston end of the device, that on the second drop being the cartridge end of the device and that on the third drop being the side of the device. The locking means of the present invention withstood these tests. As will appear, it is unique in that the cartridge case functions mechanically to operate the locking means. Since the cartridge case and locking means are fixed under standby conditions and locking means are movable only upon the firing of the cartridge, it follows that the locking means is immovable due to shock as that resulting from a drop test, for example.

The invention will be better understood from the following description when considered in connection with the accompanying drawings and its scope is indicated by the appended claim.

Figure 3:
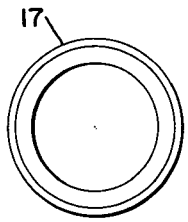
Figure 2:
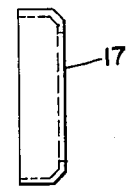
Figure 4:
Figure 5:
Figure 6:
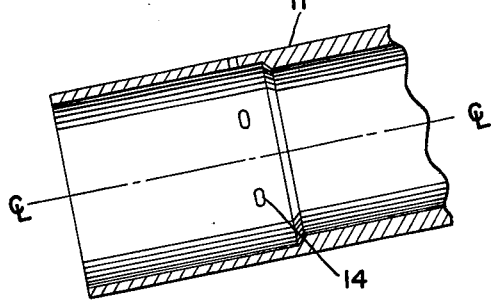

Referring to the drawings:

FIG. 1 is a partial sectional view of the gas pressure operated device of the present invention, FIGS. 2 and 3 are different views of a collar which is fixed to the fore end of the cartridge and forms a part of the locking means, FIGS. 4 and 5 are different views of keys which are another part of the locking means, and FIG. 6 illustrates a detail of the device.

The device of FIG. 1 includes an outer tube or cylinder 10, an inner tube or piston 11, and an end cap 12. The piston 11 is hollow and has at its inner end an enlarged bore 13 with a constriction at its outer end having a critical angle 23 leading to the smaller bored portion. Intermediate the ends of this enlarged bore in piston 11 are a plurality of openings 14 (FIG. 6) which, in the standby condition of the device, are aligned with an internal circumferental groove 15 in the cylinder 10.

A cartridge 16 extending into the enlarged bore 13 of the piston 11 has fixed to its outer end by cementing or press-fitting a collar 17. This collar 17 functions in its illustrated standby condition to maintain a plurality of keys 18 in a position to interlock the cylinder 10 and piston 11.

Associated with the cartridge 16 are a firing pin housing 19, a firing pin 20 and a shear pin 21 through which the firing pin is attached to the firing pin housing. In this embodiment of the invention, firing of the cartridge is effected by applying through an opening 22 in the end cap 12 a gas pressure whereby the pin 21 is sheared and the firing pin is driven against the primer of the cartridge. It is of course apparent that any of the various other conventional cartridge firing means may be employed instead of that illustrated.

In the operation of the device, the cartridge case is ruptured by the internal gas pressure and the collar 17 is driven into the critical taper angle 23 at the inner end of the enlarged bore 13 and secured therein. As a result the keys 18 are cammed out of the groove 15 and the gas pressure forces the piston 11 and collar 17 outward. In the case of a canopy remover, full separation of the piston and cylinder results. In the case of a thruster, the piston is arrested by the cylinder as it completes its stroke.

I claim:

In a gas pressure operated device the combination of a cylinder,
an end cap mounted on an inner end of said cylinder,
a hollow piston within said cylinder and coaxial therewith, said piston having at an inner end an enlarged bore constricting to a bore of smaller diameter,
means in said piston defining a plurality of aligned openings adjacent an outer end of the enlarged bore,
means in said cylinder defining an internal circumferential groove in alignment with said piston openings when said piston is in standby position within said cylinder,
an explosive cartridge extending into said piston enlarged bore and having an outer end in spaced relationship with said piston large bore constriction,
means for firing said cartridge,
a plurality of keys,
   one each of said keys located in each of said piston openings and extending into said cylinder groove,
a collar fixed to said cartridge outer end and in fixed relationship with said piston large bore constriction,
   said collar being positioned in registration and contacting
   said keys to maintain said keys in locked engagement with
   said cylinder groove in standby condition of the device,
   said collar being forced to said piston large bore constriction upon firing of said cartridge whereby said keys are released from said cylinder groove unlocking said piston from said cylinder permitting outward movement of said piston.

References Cited in the file of this patent
UNITED STATES PATENTS

| | | |
|---|---|---|
| 2,726,576 | Musser | Dec. 13, 1955 |
| 2,925,011 | Musser et al. | Feb. 16, 1960 |
| 2,926,638 | Magnus et al. | Mar. 1, 1960 |
| 2,949,822 | Musser | Aug. 23, 1960 |